United States Patent [19]

Baumgartner et al.

[11] Patent Number: 4,640,690

[45] Date of Patent: Feb. 3, 1987

[54] COLORED THERMOPLASTIC RESIN COMPOSITION CONTAINING A COLORANT HAVING AN ALKYLENOXY-SUBSTITUTED CHROMOPHORE GROUP

[75] Inventors: Alan S. Baumgartner; Patrick D. Moore; Richard A. VanDahm, all of Spartanburg, S.C.

[73] Assignee: Milliken Research Corporation, Spartanburg, S.C.

[21] Appl. No.: 775,614

[22] Filed: Sep. 13, 1985

[51] Int. Cl.$^4$ .......................... D06P 3/00; D06P 5/13; D06P 3/79; D06P 3/24

[52] U.S. Cl. ............................................ 8/506; 8/403; 8/508; 8/509; 8/512; 8/513; 8/514; 8/518; 524/83; 524/84; 524/87; 524/88; 524/159; 524/167; 524/190; 524/583; 524/585

[58] Field of Search .................. 8/508, 513, 506, 514, 8/509, 403, 518, 516, 512; 524/88, 190, 167, 159, 83, 84, 87

[56] References Cited

U.S. PATENT DOCUMENTS

| | | |
|---|---|---|
| 3,157,663 | 11/1964 | Kuhn . |
| 3,927,044 | 12/1975 | Foster et al. . |
| 4,077,962 | 3/1978 | Beecken ................................. 8/636 |
| 4,144,028 | 3/1979 | Hauser et al. .......................... 8/403 |
| 4,167,510 | 9/1979 | Brendle ................................. 8/403 |
| 4,284,729 | 8/1981 | Cross et al. . |
| 4,332,587 | 6/1982 | Kressner et al. ....................... 8/513 |
| 4,400,320 | 8/1983 | Keller et al. . |
| 4,477,635 | 10/1984 | Mitra . |

OTHER PUBLICATIONS

Plastics Compounding, 1984/85, Redbook, pp. 50–66.
Modern Plastics Encyclopedia, Colorants, 1984/85, p. 606.

*Primary Examiner*—Herbert J. Lilling
*Attorney, Agent, or Firm*—H. William Petry; Terry T. Moyer

[57] ABSTRACT

A colored thermoplastic resin composition is provided which comprises a thermoplastic resin and a colorant in the form of an alkyleneoxy-substituted chromophore group provided in said thermoplastic resin in a minor amount sufficient to provide coloration to said thermoplastic resin. A process for preparing colored thermoplastic resins is also provided.

8 Claims, No Drawings

COLORED THERMOPLASTIC RESIN COMPOSITION CONTAINING A COLORANT HAVING AN ALKYLENOXY-SUBSTITUTED CHROMOPHORE GROUP

The present invention relates to a colored thermoplastic resin composition and to a process for preparing such compositions. More particularly, the present invention relates to a thermoplastic resin composition which has been colored by means of a polyalkyleneoxy-substituted chromophore group.

It is known that thermoplastic resin compositions may be colored by the addition of dyes or pigments to the resin. Such dyes or pigments are commonly used as dry powders, masterbatches, resin concentrates or dispersions in low molecular weight liquid carriers. Thermoplastic resin compositions which have been colored using pigments in particular may be frequently opaque and may lack the brilliance of color afforded by the use of dyes. Also, considerably more pigment may ordinarily be required to achieve the same tinctorial strength as that which may be obtained with a dye. Use of pigments furthermore may give rise to problems with handling, storage, incorporation, and color blending.

Certain of the deficiencies inherent in pigments, e.g., dullness-of-color, low tinctorial strength, and undesired opacity in certain applications may be overcome by the use of polymer-soluble dyes. Thermoplastic resin compositions which have been colored using polymer-soluble dyes may thus afford products characterized by improved clarity, brilliant colors, and high tinctorial strength. The use of polymer-soluble dyes, however, may lead to dye migration problems and even solvent extraction of the dye from the colored thermoplastic resin. These problems may be particularly acute in low glass transition temperature, flexible resins such as polyethylene, polypropylene, plasticized polyvinyl chloride and other resins of a similar nature (See Plastics Compounding 1984/85 Redbook, pp. 50–66, Modern Plastics Encyclopedia, Colorants, 1984/85, p. 606). Due to these problems, the use of polymer-soluble dyes may generally not be recommended in such resins and few dyes are in fact recommended by their manufacturers for use in such resin systems.

Attempts have been made to use polymeric dyes in the coloration of thermoplastic resins. These dyes may, however, be difficult to make and may also be difficult to incorporate into thermoplastic resins (as to manufacture of these dyes see U. S. Pat. No. 4,477,635 to Mitra, assigned to 3M Corp.).

According to the present invention many of the problems associated with the coloration of thermoplastic resins and many of the deficiencies associated with prior art colored thermoplastic resin products may be obviated or overcome. Thus, as compared to conventional dyes, the coloring agents which are employed according to the present invention typically may exhibit a significantly and surprisingly diminished tendency toward color migration and solvent extraction of the colorant from the thermoplastic resin. These observations are especially noticeable in those resins having a generally low glass transition temperature such as certain polyolefins, polyvinyl chloride and other similar resins. Furthermore, as compared to pigments and possibly even some conventional dyestuffs, improved clarity and tinctorial strength may also be achieved.

Lastly, the coloring agents employed in the thermoplastic resin compositions of the present invention may be provided, if desired, in the liquid phase at ambient conditions of temperature and pressure (although the invention is certainly not limited to liquid phase colorants). Because they may be in the liquid phase, they may provide many processing advantages during actual use, including improved handling, storage, incorporation and color blending.

Accordingly, the present invention provides a colored thermoplastic resin composition which comprises a thermoplastic resin and a colorant in the form of a polyalkyleneoxy-substituted chromophore group provided in said thermoplastic resin in a minor amount sufficient to provide coloration to said thermoplastic resin.

Thermoplastic resins which may be used according to the present invention include a wide range of synthetic resins and synthetic resin compositions which are known in the art as being essentially thermoplastic in nature. The term "thermoplastic" is used herein in its conventional sense to mean a resin "having the property of softening or fusing when heated and of hardening again when cooled" (see Webster's Seventh Collegiate Dictionary, G & C Merriam Co., 1965). Thermoplastic resins are to be clearly distinguished both in terms of their essential physical and chemical characteristics from thermosetting resins. The term "thermosetting" used herein is also used in its conventional sense to mean a resin "having the property of becoming permanently rigid when heated or cured.

Examples of thermoplastic resin systems which may be employed include a wide range of polyolefin polymers, e.g., polyethylene, linear low density polyethylene, polypropylene, polybutylene and copolymers made from ethylene, propylene and/or butylene. Other thermoplastic polymers which may be employed according to the present invention include polyvinyl chloride, polyvinylidene chloride, cellulosic resins such as cellulose acetate, cellulose acetate butyrate and cellulose acetate propionate, acrylic resins such as polymethyl methacrylate, styrene acrylonitrile, polystyrene, polycarbonate and acrylonitrile-butadiene-styrene (herein ABS), polyamides such as nylon 6 and nylon 66 and polyesters such as polyethylene terephthalate, especially glycol modified polyethylene terephthalate and polybutylene terephthalate.

As mentioned above, the thermoplastic resins of the present invention are provided with coloration. The colorants may be most broadly described as polyalkyleneoxy-substituted chromophore groups. Colorants of this general type have found use in the past as fugitive tints as disclosed in U.S. Pat. No. 3,157,663 to Kuhn (incorporated by reference). Other colorants which may be employed according to the present invention include the alkaline-stable colorants of the triphenylmethane type as described in U.S. Pat. No. 3,927,044 (incorporated by reference).

Yet another category of colorants which may be employed in the composition and process of the present invention are the ester capped polyalkyleneoxy colorants disclosed in U.S. Pat. No. 4,167,510 (incorporated by reference). Such colorants comprise an organic chromophore group having from 1 to 5 capped polyalkyleneoxy units wherein the total of alkyleneoxy units in the molecule are from 2 to about 300. The alkylene moiety of the polyalkyleneoxy units contains from 2 to about 4 carbon atoms. The properties of the colorants may be varied depending upon the particular capping moiety employed, the presence or absence of at least one ionic group and the total number of alkyleneoxy units present in the colorant.

Still another category of colorants which may be employed according to the present invention includes those disclosed in U.S. Pat. No. 4,400,320, Keller, et al. (incorporated by reference). Such colorants may be characterized by the formula:

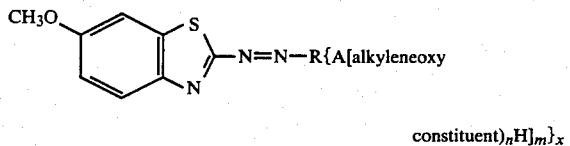

wherein R is selected from meta-toluidene, meta-aminophenol, aniline or dimethoxyaniline; A is selected from N, O, S or $CO_2$; the alkylene group of the alkyleneoxy constituent contains from 2 to about 4 carbon atoms; n is an integer of from 2 to about 300; m is 1 when A is O, S, or $CO_2$, and 2 when A is N; x is an integer of from 1 to about 5; and the product of n.m.x is from 2 to about 400.

More recently, colorants of the general type employed in the present thermoplastic resin compositions have found utility in the coloration of thermosetting resins as described in Cross, et al., U.S. Pat. No. 4,284,729. Significantly with regard to the Cross, et al. discovery, the colorant is chemically bound to the polymer molecule, typically during the polyaddition reaction by means of which the thermosetting polymer is formed. In addition the colorants of Cross, et al. have been generally considered to be of a type which is "chemically compatible" with the polymer or resin environment. By contrast, the colorants according to the present invention are actually incorporated into a resin system comprised of preformed polymers so that there are essentially no reactive groups by means of which the colorant could become chemically bound to the polymer molecules. Polyalkyleneoxy-substituted chromophore groups, furthermore, have heretofore been considered by those most familiar with the properties of such colorants to be essentially incompatible with certain thermoplastic resin system environments which, in the case for instance of polyolefins, are typically non-polar or hydrophobic environments. It is, therefore, all the more surprising that such colorants, which by virtue of their polar, polyalkyleneoxy groups are generally hydrophilic in nature, find utility in the coloration of such thermoplastic resin systems.

The chromophore group of the colorant may vary widely, and may include compounds characterized in the art as dyestuffs or as pigments. The actual group used will depend to a large extent upon, for instance, the desired color and colorfastness characteristics. The chromophore group may be attached to at least one polyalkyleneoxy-substitutent through a suitable linking moiety such as nitrogen, oxygen, sulfur, etc. Examples of chromophore groups include nitroso, nitro, azo (including monoazo, disazo, trisazo, tetrakisazo, polyazo, formazan, azomethine and metal complexes thereof), stilbene, diarylmethane, triarylmethane, xanthene, acridine, quinoline, methine (including polymethine), thiazole, indamine, indophenol, azine, thiazine, oxazine, aminoketone, hydroxyketone, anthraquinone (including anthrapyrazolines, anthrone, anthrapyridone, anthrapyrimidine, flavanthrone, pyranthrone, benzanthrone, perylene, perinone, naphthalimide and other structures formally related to anthraquinone), indigoid (including thioindigoid), and phthalocyanine chromophore groups. Particularly useful in the preparation of the colorants used in the compositions of the invention may be the azo, anthraquinone, triarylmethane and methine dyestuff radicals.

The chromophore group of the colorants employed in the compositions of the present invention may be substituted with at least one polyalkyleneoxy group. Typical of such groups which may be attached to the chromophore group are the polymeric epoxides, such as the polyalkylene oxides and copolymers thereof. Typical polyalkylene oxides and copolymers of same which may be employed to provide the colorants include those made from alkylene oxide monomers containing from one to about four carbon atoms. Examples include polyethylene oxides, polypropylene oxides, polybutylene oxides, copolymers of polyethylene oxides, polypropylene oxides and polybutylene oxides, and other copolymers including block copolymers, in which a majority of the polymeric substituent is polyethylene oxide, polypropylene oxide and/or polybutylene oxide. Further, such polyalkyleneoxy group may have an average molecular weight in the range of from about 132 to about 10,000, preferably from about 176 to about 5000.

It is to be understood that because the colorants may not ordinarily be chemically bound to the thermoplastic polymer, the precise chemical identity of the end group on the polyalkyleneoxy group may not be critical insofar as the proper functioning of the colorant is concerned in the composition. With this consideration in mind certain most preferred colorants will be defined where certain end groups will be identified. Such recitation of end groups is not to be construed as limiting the invention in its broader embodiments in any way. According to such a most preferred embodiment the colorants may be characterized as follows:

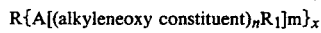

wherein R-A is an organic chromophore group, A is a linking moiety in said organic chromophore group selected from the group consisting of N, O, S or $CO_2$, the alkylene moiety of the alkyleneoxy constituent contains from 2 to about 4 carbon atoms, n is an integer of from 2 to about 230, m is 1 when A is O, S, $CO_2$ and 1 or 2 when A is N, x is an integer of from 1 to 5, and the product of n times x times m (n.m.x) is from 2 to about 230, and $R_1$ is a member of the group consisting of

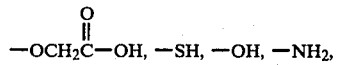

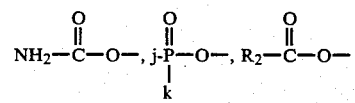

and sulfonates and sulfates of each of the members of said group, wherein $R_2$ is H, an alkyl radical containing up to about 20 carbon atoms or carboxy-terminated alkyl radical containing up to about 20 carbon atoms, j and k are OH, OM or $OR_3$ wherein M is a cation moiety of an alkali metal, an alkaline earth metal, transition metal, e.g., nickel, etc. or ammonium, and $R_3$ is an alkyl radical containing up to about 20 carbon atoms.

As mentioned above, the colorants may be employed in the thermoplastic resins in a minor amount sufficient to provide the desired degree of coloration in the resin. The actual amount used will, in addition to the desired depth of shade, depend upon the tinctorial strength of the chromophore used and the overall molecular weight of the colorant, e.g., chromophore plus polyalkyleneoxy chain length. Typically the amount of colorant employed may be from about 0.0001 percent to about 5 percent, preferably from about 0.001 percent to about 3 percent, by weight based upon the overall weight of the resin composition.

Other conventional additives may also be present in the resin compositions of the present invention. For instance, such additives may include plasticizers, antioxidants, stabilizers, lubricants, flame retardants, nucleating agents and other additives which will be readily identified by those skilled in the art. In general, the colorants have been observed to have little or no adverse interactions with these conventional additives.

Because the colorants if used properly ordinarily do not detract from the clarity of the resin, it has been found that additives which improve the clarity of such resins may be particularly desirable for use in combination with colorants as described herein to provide resin products that are both colored and which also have excellent clarity. One particular class of additives which have been found to be useful in this regard are the benzylidene sorbitols including substituted benzylidene sorbitols such as those described in U.S. Pat. No. 4,016,118 to Hamada, et al. (E. C. Chemical); U.S. Pat. No. 4,371,645 to Mahaffey (Milliken Research Corporation); and Japanese Pat. No. SHO [1977] 53-117044 to Kobayashi, et al. (New Japan Chemical); all of these patents being hereby incorporated herein by reference.

Any suitable procedure may be employed to produce the colorants of the invention whereby the polyalkyleneoxy group, or groups, are coupled to a chromophore group. For example, the procedure set forth in U. S. Pat. No. 3,157,663, hereby incorporated by reference, may be employed. The particular shade of the colorant will depend primarily upon the particular chromophore group selected. A large variety of colors and shades may be obtained by blending two or more colorants. Blending of the colorants of the present invention can be readily accomplished as the colorants are polymeric materials which may have substantially identical solubility characteristics, which are dictated by the nature of the polymeric chain. Therefore, the colorants are in general soluble in one another, and are also in general completely compatible with each other.

For example, the colorants of the invention may be prepared by converting a dyestuff intermediate containing a primary amino group into the corresponding polymeric compound and employing the resulting compound to produce a compound having a chromophoric group in the molecule. In the case of azo colorants, this may be accomplished by reacting a primary aromatic amine with an appropriate amount of an alkylene oxide or mixtures of alkylene oxides, such as ethylene oxide, propylene oxide, or even butylene oxide, according to procedures well known in the art, and then coupling the resulting compound with a diazonium salt of an aromatic amine. In order to prepare colorants of the triarylmethane class, aromatic amines that have been reacted as stated above with an alkylene oxide are condensed with aromatic aldehydes and the resulting condensation products are oxidized to form the triarylmethane colorants. While azo, methine, triarylmethane and anthraquinone colorants are preferred because of their ease of preparation and brilliance of color as well as the multitude of shades available, many other colorants may be prepared by known procedures.

According to the process of the invention, the colorant may be incorporated into the thermoplastic resin using conventional techniques such as those employed to incorporate other additives in such resins. For instance, the colorant may be incorporated into the resin by simply adding it to the resin while the resin is in a plasticized or molten state, typically prior to formation of the polymer into its final shape, e.g., by molding, extrustion, blow-molding and the like. For instance, when the thermoplastic resin to be colored is a polyolefin resin the process may be carried out by adding a colorant comprised of a polyalkyleneoxy-substituted chromophore group directly to the molten polymer, by tumbling it onto a pre-extruded pellitized resin, or by mixing it into the resin powder prior to extrusion. The polymer may then be molded or extruded in the usual manner, i.e., in the same way as for polyolefin resins which are not colored. Details about these procedures may be found in the relevant literature.

Alternatively, a concentrate of the colorant in an appropriate resin or vehicle may first be prepared. Such concentrate may contain an appropriately high percentage of colorant. The concentrates may be in the form of liquids, solids, e.g., powders, pellets, etc., as may be desired. These concentrates may then be incorporated into the thermoplastic resin as is well understood in the art.

The colorants used in the process and in the composition of the present invention are polymeric colorants which may according to one embodiment be in the liquid phase. Thus, if in the liquid phase, they may be added to the thermoplastic polymer melt in solvent-free form rather than in the form of solutions or dispersions in a suitable solvent or dispersing medium. Obviously liquids may have certain processing advantages over solids; and moreover liquids may, if desired, be added directly to the molten polymer and therefore contain no extraneous solvent or dispersing agents. This process may, therefore, provide unusual and advantageous properties in the final thermoplastic resin product. Alternatively, however, the colorants may be premixed with minor amounts of a solvent or dispersing agent which is compatible with the resin, thus providing certain processing advantages.

The following examples illustrate the invention, but are not to be construed as limiting the invention which is defined in the claims appended hereto. The parts and percentages, unless otherwise indicated are all by weight.

EXAMPLE 1

One hundred and sixty-five and four tenths parts of 2-chloro-4-(methylsulfone)aniline were added to a cold (less than 40° C.) mixture of 205.5 parts of 70% sulfuric acid and 535 parts water. One and six tenths parts of 2-ethylhexanol were added followed by the slow addition of 370.5 parts of 40% nitrosyl sulfuric acid. The temperature was maintained at less than 0° C. during the addition by use of a dry ice/isopropanol bath. The solution was stirred about 1.5 hours. Excess nitrite was then destroyed by slow additions of a total of 10 parts of sulfamic acid. The absence of nitrite was determined by the use of starch-iodide indicator paper. The resulting yellow solution contains 0.627 millimoles per gram of active diazonium salt and was maintained at a temperature less than 0° C. until used.

Thirty-one and five tenths millimoles of the ten mole ethoxylate of aniline were mixed with 50 parts of water. Thirty millimoles (47.8 parts) of the above described diazo solution were then slowly added with stirring. The temperature was maintained at 20°-30° C. by the addition of crushed ice. The solution was allowed to stand for at least one hour and then neutralized by the addition of 50% aqueous sodium hydroxide. The mixture thus obtained was extracted with 50 milliliters of methylene chloride. The methylene chloride extract was washed twice with equal portions of water and the methylene chloride then removed under reduced pressure to afford the product.

Using the general procedure described above, a series of related colorants were prepared. A generalized structure for the colorants is set forth below and the colorants are more specifically defined in Tables 1 and 2 below:

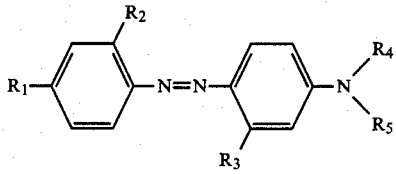

wherein $R_1-R_5$ are set forth in Tables 1 and 2.

Liquid products were isolated by extraction with 50 milliliters of methylene chloride. The methylene chloride extract was washed twice with an equal portion of water and then evaporated to dryness under reduced pressure to afford the product. Crystalline products were isolated by filtration, washed with water, and then recrystallized from ethanol/water.

The colorants listed in Table 1 were prepared in order to provide a comparison between the colorants used in the composition of this invention (runs 1 through 17) and their conventional dyestuff equivalents which are runs 18 through 21 in Table 2. The colorants contained in Table 1 are all liquids at ambient temperature while those listed in Table 2 are solids. The comparative data is set forth in Examples 10 and 16 below.

The following abbreviations are utilized in the following tables: EO=ethylene oxide, PO=propylene oxide; Et=ethyl; Ac=acetyl. Also where numbers are separated by diagonals, e.g. 2/15/5, such refers to moles EO/ moles PO/ moles EO. Unless otherwise indicated, the polylkylenoxy groups are hydroxyl terminated.

TABLE 1

| Run Number | $R_1$ | $R_2$ | $R_3$ | $R_4R_5$ | Average Molecular Weight |
|---|---|---|---|---|---|
| 1 | $CH_3SO_2$ | Cl | H | 4EO | 485 |
| 2 | " | " | " | 2EO/2PO | 513 |
| 3 | " | " | " | 2EO/4PO | 629 |
| 4 | " | " | " | 2EO/6PO | 745 |
| 5 | " | " | " | 10EO | 749 |
| 6 | " | " | $CH_3$ | " | 763 |
| 7 | " | " | H | 2EO/8PO | 861 |
| 8 | " | " | $CH_3$ | 2/5/5 | 921 |
| 9 | " | " | H | 2EO/10PO | 977 |
| 10 | " | " | " | 2/10/3 | 1109 |
| 11 | $NO_2$ | H | " | 20EO | 1120 |
| 12 | $CH_3SO_2$ | Cl | $CH_3$ | 2/10/3 | 1123 |

TABLE 1-continued

| Run Number | $R_1$ | $R_2$ | $R_3$ | $R_4R_5$ | Average Molecular Weight |
|---|---|---|---|---|---|
| 13 | " | " | " | 2/10/6 | 1255 |
| 14 | " | " | H | 2/15/5 | 1487 |
| 15 | " | " | $CH_3$ | 2/14/8 | 1575 |
| 16 | " | " | " | 20EO/20PO | 2363 |
| 17 | " | " | H | 200EO | 9109 |

TABLE 2

| Run Number | $R_1$ | $R_2$ | $R_3$ | $R_4R_5$ | Average Molecular Weight |
|---|---|---|---|---|---|
| 18 | $CH_3SO_2$ | Cl | H | $CH_3$ | 337 |
| 19 | " | " | $CH_3$ | $CH_3$ | 351 |
| 20 | " | " | H | 2EO | 397 |
| 21 | " | " | $CH_3$ | " | 411 |

EXAMPLE 2

Fifteen milliliters of 2N sodium carbonate (0.03 moles) were mixed with 15 milliliters of water. Five and nineteen hundredths parts of sulfanilic acid (0.03 moles) and 30 milliliters of 1N sodium nitrite (0.03 moles) were then added to the solution. In a separate vessel 37.5 milliliters of 2N hydrochloric acid (0.075 moles) and 30 parts ice were mixed. This mixture was cooled to between 5 and 10° C. The sodium carbonate/water/sulfanilic acid/ sodium nitrite mixture was added slowly with stirring to the cool hydrochloric acid solution. The temperature during the addition did not exceed 10° C. The mixture containing a white precipitate was allowed to react for 5 minutes with continued cooling. Sulfamic acid was then added to destroy excess nitrite as monitored by starch-iodide paper.

A mixture of the ten mole ethoxylate of aniline (0.035 moles) and 50 parts of water was added slowly to the diazo mixture prepared above while controlling the temperature between 5 and 10° C. The mixture was allowed to stand for at least one hour after addition was complete. The reaction mixture was then neutralized with 50% aqueous sodium hydroxide and the solvent removed under reduced pressure. Twenty milliliters of isopropanol was added to the residue and the mixture allowed to heat at reflux for 5 minutes. This mixture was then filtered to remove unwanted salts. The solvent was then removed from the filtrate under reduced pressure to afford the desired product.

A series of colorants were prepared using the preparation described above for use in generating the comparative data set forth in Examples 10 and 15 as to the significance of the presence of an ionic group on the chromophore. The colorants which had the following general structure were prepared:

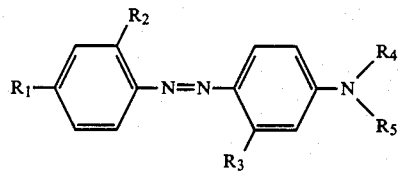

The colorants prepared in this manner are listed in Table 3 below. All the colorants listed in this table were obtained as liquids.

TABLE 3

| Run Number | $R_1$ | $R_2$ | $R_3$ | $R_4R_5$ | Average Molecular Weight |
|---|---|---|---|---|---|
| 1 | $SO_3^-Na^+$ | H | H | 4EO | 452 |
| 2 | " | " | " | 2EO/4PO | 598 |
| 3 | " | " | " | 2EO/6PO | 714 |
| 4 | " | " | $CH_3$ | 2EO/6PO | 728 |
| 5 | " | " | " | 10/EO | 732 |
| 6 | " | " | " | 2/5/5 | 890 |
| 7 | " | " | H | 2EO/10PO | 946 |
| 8 | " | " | " | 2/10/3 | 1078 |
| 9 | " | " | $CH_3$ | 2/10/3 | 1092 |
| 10 | " | " | H | 20EO | 1158 |
| 11 | " | " | $CH_3$ | 20EO | 1172 |
| 12 | " | " | " | 2/10/6 | 1224 |
| 13 | " | " | H | 2/15/5 | 1456 |
| 14 | " | " | $CH_3$ | 2/14/8 | 1544 |
| 15 | " | " | " | 20EO/20PO | 2332 |

EXAMPLE 3

Five tenths grams (0.5) of the colorant described in Example 1 #20 was dissolved in 15 milliliters of tetrahydrofuran, One drop of pyridine and 0.27 grams of sodium carbonate were then added to this solution. 0.0025 moles of the decanoyl chloride was thn added and the resulting mixture was heated gently in a steam bath. The progress of the reaction was monitored by use of thin layer chromatography. After the reaction was complete the tetrahydrofuran was boiled off in a steam bath and the resulting waxy solid dissolved in 50 milliliters of methylene chloride. The methylene chloride solution was washed with equal volumes of water, 5% aqueous sodium bicarbonate, and water again. The methylene chloride was then removed under reduced pressure to afford the desired product.

A series of colorants were prepared for use in obtaining the comparative data set forth in Example 10 as to the effect of substituting an alkyl substituent of equal molecular weight for the polyalkyleneoxy substituent contained in the colorants used in the composition of this invention. A series of colorants of the following general structure were prepared:

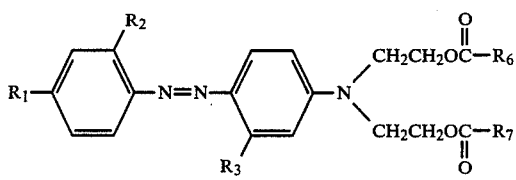

The colorants prepared by this procedure are listed in Table 4 below.

TABLE 4

| Run Number | $R_1$ | $R_2$ | $R_3$ | $R_6R_7$ | Average Molecular Weight |
|---|---|---|---|---|---|
| 1 | $SO_3^-Na^+$ | H | H | $CH_3$ | 482 |
| 2 | $SO_2CH_3$ | Cl | " | $C_3H_7$ | 538 |
| 3 | " | " | " | $C_9H_{19}$ | 706 |

EXAMPLE 4

One hundred sixty grams of the 10 mole ethoxylate of aniline was heated with 60 grams of sulfamic acid under nitrogen at 140° C. for 6 hours. The resulting product was cooled and diluted with 50 milliliters of methanol. The excess sulfamic acid was removed by filtration. The filtrate was neutralized with 48 grams of 50% aqueous sodium hydroxide and the excess water, methanol and ammonia removed under reduced pressure. The resulting glassy solid was liquified by addition of 100 grams of water. This intermediate material was then converted to a colorant, having an average molecular weight of 953, of the following structure by use of the method described in Example 2.

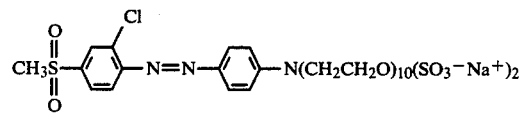

This material was used to generate comparative date as set forth in Examples 10 and 15 as to the effect of end groups on the performance of the colorants in thermoplastic resin compositions.

EXAMPLE 5

Using the procedure set forth in Example 3, 0.00125 mole of the colorant described in Table 1 #14 was allowed to react with 0.0025 mole of acetyl chloride to afford the following product which was determined to have an average molecular weight of 1571.

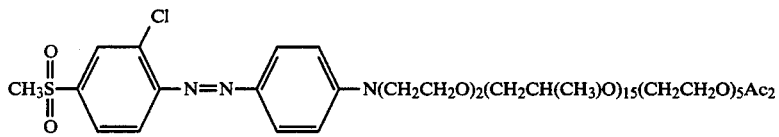

This colorant was used to generate comparative data as set forth in Example 10 below to further demonstrate the effect on end group substitutions on the colorants used in the composition of this invention.

EXAMPLE 6

Using the procedure described in U.S. Pat. No. 4,137,243, Example 1 (incorporated by reference), a series of colorants of the following general structure were prepared from quinizarin and the appropriate polyalkyleneoxy aliphatic amine. The colorants prepared in this manner were obtained as liquids and are listed in Table 5 below.

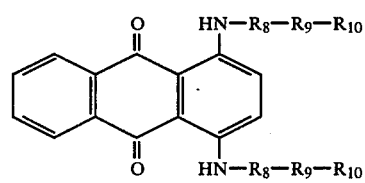

These colorants and those described in Examples 7, 8 and 9 below were prepared to demonstrate the possibility for use of a wide range of chromophore groups in preparing the colorants used in the composition of this invention.

TABLE 5

| Run Number | R8 | R9 | R10 | Average Molecular Weight |
|---|---|---|---|---|
| 1 | CH2CH2CH3 | 2EO | OH | 530 |
| 2 | CH2CH(CH3) | 2PO | C11H23 | 804 |
| 3 | " | 2PO/4EO | C4H9 | 924 |
| 4 | " | 9PO/IEO | CH3O | 1404 |
| 5 | " | 3PO/19EO | " | 2204 |
| 6 | " | 32PO/3EO | " | 4204 |

EXAMPLE 7

Using the procedure described in Example 1, a series of colorants of the following general structure were prepared by coupling the diazonium salt of 2-amino-6-methoxybenzothiazole with the appropriate polyalkyleneoxy aniline.

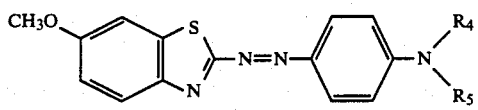

The colorants prepared by this procedure were obtained as liquids and are listed in Table 6 below.

TABLE 6

| Run Number | R4R5 | Average Molecular Weight |
|---|---|---|
| 1 | 4EO | 460 |
| 2 | 10EO | 724 |
| 3 | 2EO/8PO | 836 |
| 4 | 20EO | 1164 |

EXAMPLE 8

Using the procedure described in U. S. Pat. No. 4,507,407, Example 1 (incorporated by reference), a series of colorants of the following general structure were prepared by coupling the diazonium salt of 2-amino-3,5-dicyano-4-methyl thiophene with the appropriate polyalkyleneoxy aniline.

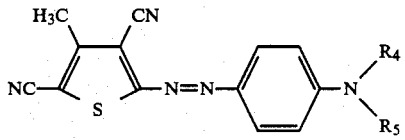

The colorants prepared by this procedure were obtained as liquids and are listed in Table 7 below.

TABLE 7

| Run Number | R4R5 | Average Molecular Weight |
|---|---|---|
| 1 | 10EO | 707 |
| 2 | 2EO/8PO | 819 |
| 3 | 20EO | 1147 |

EXAMPLE 9

1-(p-tolyl)-3-methyl-5-pyrazalone and the ten mole ethoxylate of p-aminobenzaldehyde were mixed in equal molar amounts and heated at 110° C. The progress of the reaction was monitored by observing the disappearance of the ultraviolet absorbence peak at 341 nanometers. Heating was continued until this peak had disappeared. No further work-up was required. Colorants of the following general structure were prepared.

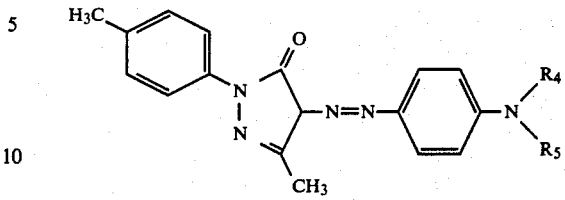

The colorants prepared were obtained as liquids and are listed in Table 8 below.

TABLE 8

| Run Number | R4R5 | Average Molecular Weight |
|---|---|---|
| 1 | 5EO | 511 |
| 2 | 10EO | 731 |
| 3 | 15EO | 951 |
| 4 | 20EO | 1171 |

EXAMPLE 10

Tests were conducted to determine the extractability of colorants prepared according to Examples 1 through 9 above from polypropylene homopolymer. First the color value of the colorants to be tested was determined using the procedure detailed in Example Number 9 of U.S. Pat. No. 4,507,407 (incorporated by reference). Several commercially available dyestuffs reported to have utility in coloring certain thermoplastic resins were included in this study for comparative purposes. In order to correct for differences in color strength among the colorants, the weight of each colorant used was adjusted according to its color value by use of the following formula:

$$22.9/\text{color value} = \text{weight used}$$

The proper weight of the colorant to be tested was added to 1000 grams of Hercules Profax ® 6301 polypropylene homopolymer pellets. The mixture was then drum tumbled for 20 minutes to ensure uniform colorant distribution over the surface of the pellets. In cases where the colorant was a solid or semi-solid, it was first dissolved in the minimum amount of methanol necessary to produce a uniform solution and was then added to the resin pellets. The colored pellets were then injection molded at 428° F. into 3 inch by 2 inch plaques with a bi-level thickness of 50 mils and 85 mils.

These plaques were then place in a Soxlet extraction apparatus and extracted with acetone for eight hours. The extracts were then each concentrated to a volume of 100 milliliters and the absorbance of the extracts was determined using a Beckman DU-7 spectrometer. The spectrometer was zeroed using the extract of an uncolored plaque and the maximum absorbance between 400 and 700 nanometers was recorded. The percent colorant extracted was then calculated using the following formula:

$$\% \text{ extracted} = \frac{\text{extract absorbance} \times 10}{\text{color value} \times CW}$$

wherein CW is the weight of colorant in the plaque. This number was obtained by multiplying the weight of the plaque by the amount of colorant used per one gram of resin.

Tables 9 and 10 demonstrate the effect of the composition of the polyalkylene substituent and molecular weight on the extractability of the colorants.

TABLE 9

| Colorant | EO/PO Content | Average Molecular Weight | Weight Per 1000 g Resin | Color Value | % Extracted |
|---|---|---|---|---|---|
| Ex. 1 | | | | | |
| #1 | 4EO | 485 | 0.42 | 54.3 | 3.5 |
| 2 | 2EO/2PO | 513 | 0.43 | 53.1 | 2.6 |
| 3 | 2EO/4PO | 629 | 0.49 | 47.2 | 2.3 |
| 4 | 2EO/6PO | 745 | 0.61 | 37.6 | 1.7 |
| 5 | 10EO | 749 | 0.58 | 39.8 | 0.9 |
| 6 | 10EO | 763 | 0.54 | 42.3 | 1.1 |
| 7 | 2EO/8PO | 861 | 0.67 | 34.4 | 1.3 |
| 8 | 2/5/2 | 921 | 0.68 | 33.8 | 1.2 |
| 9 | 2EO/10PO | 977 | 0.80 | 28.8 | 1.2 |
| 10 | 2/10/3 | 1109 | 0.90 | 25.6 | 0.8 |
| 11 | 20EO | 1122 | 1.52 | 15.0 | 0.5 |
| 12 | 2/10/3 | 1123 | 0.82 | 27.8 | 1.0 |
| 13 | 2/10/6 | 1255 | 1.00 | 22.9 | 0.8 |
| 14 | 2/15/5 | 1487 | 1.08 | 21.2 | 1.1 |
| 15 | 2/14/8 | 1575 | 1.18 | 19.5 | 1.2 |
| 16 | 20EO/20PO | 2363 | 1.94 | 11.8 | 0.2 |
| 17 | 200EO | 9109 | 13.63 | 1.7 | 0.2 |

TABLE 10

| Colorant | EO/PO Content | Average Molecular Weight | Weight Per 1000 g Resin | Color Value | % Extracted |
|---|---|---|---|---|---|
| Ex. 6 | | | | | |
| #1 | 4EO | 530 | 1.53 | 15.0 | 1.6 |
| #2 | 4PO | 804 | 1.80 | 12.7 | 5.9 |
| #3 | 4PO/8EO | 924 | 1.90 | 12.1 | 3.2 |
| #4 | 18PO/2EO | 1404 | 3.09 | 7.4 | 1.9 |
| #5 | 6PO/38EO | 2204 | 4.87 | 4.7 | 1.2 |
| #6 | 64PO/6EO | 4204 | 9.96 | 2.3 | 1.0 |
| Ex. 7 | | | | | |
| #1 | 4EO | 460 | 0.26 | 89.9 | 3.8 |
| #2 | 10EO | 724 | 0.40 | 57.2 | 1.4 |
| #3 | 2EO/8PO | 836 | 0.45 | 50.8 | 2.2 |
| #4 | 20EO | 1164 | 0.67 | 34.3 | 0.8 |
| Ex. 8 | | | | | |
| #1 | 10EO | 707 | 0.47 | 49.1 | 0.8 |
| #2 | 2EO/8PO | 819 | 0.52 | 44.5 | 1.6 |
| #3 | 20EO | 1147 | 0.77 | 29.1 | 0.4 |
| Ex. 9 | | | | | |
| #1 | 5EO | 511 | 0.36 | 64.0 | 5.0 |
| #2 | 10EO | 731 | 0.60 | 38.6 | 2.5 |
| #3 | 15EO | 951 | 0.75 | 30.5 | 1.9 |
| #4 | 20EO | 1171 | 1.02 | 22.4 | 1.7 |

It is evident from this data that polyalkyleneoxy substituents containing a relatively higher percentage of the more hydrophilic ethyleneoxy groups tend to perform better with respect to non-extractability and that increasing molecular weight does tend to improve non-extractability characteristics.

Table 11 shows the performance of conventional polymer soluble dyes with respect to solvent extraction under the same conditions as above.

TABLE 11

| Colorant | EO/PO Content | Weight Per 1000 g Resin | Color | % Extracted |
|---|---|---|---|---|
| Ex. 1 | | | | |
| #18 | — | 0.36 | Orange | 19.9 |
| #19 | — | 0.35 | " | 20.4 |
| Solvent Red 135 | — | 1.00 | Red | 5.7 |
| Solvent Blue 130 | — | 0.40 | Blue | 14.9 |
| Solvent | — | 0.70 | Yellow | 16.1 |

TABLE 11-continued

| Colorant | EO/PO Content | Weight Per 1000 g Resin | Color | % Extracted |
|---|---|---|---|---|
| Yellow 141 | | | | |

As can be readily seen, these non-polyalkyleneoxy containing colorants do not perform as well with respect to non-extractability as do the polyalkyleneoxy colorants.

Table 12 shows a comparison between plyalkyleneoxy containing colorants and alkyl derivatives of similar structure and molcular weight when extracted under the conditions of this test.

TABLE 12

| Colorant | EO/PO Content | Average Molecular Weight | Weight Per 1000 g Resin | Color Value | % Extracted |
|---|---|---|---|---|---|
| Ex. 1 #2 | 2EO/2PO | 513 | 0.43 | 53.1 | 2.6 |
| Ex. 3 #2 | alkyl | 538 | 0.61 | 37.6 | 12.5 |
| Ex. 1 #5 | 10EO | 749 | 0.58 | 39.8 | 0.9 |
| Ex. 3 #3 | alkyl | 706 | 0.56 | 40.9 | 7.4 |

It can be seen that those colorants containing polyalkyleneoxy substituents perform far better than colorants of equivalent molecular weight containing alkyl substituents under the conditions of this test.

Table 13 demonstrates the effect to various end groups on the colorant extractability. Under the conditions of this test, there was no dependence observed of extractability on end group composition.

TABLE 13

| Colorant | EO/PO Content | End Group | Weight Per 1000 g Resin | % Extracted |
|---|---|---|---|---|
| Ex. 1 #5 | 10EO | OH | 0.58 | 1.0 |
| Ex. 3 | 10EO | $SO_3^-Na^+$ | 0.92 | 0.8 |
| Ex. 1 #14 | 2/15/5 | OH | 1.08 | 1.1 |
| Ex. 4 | 2/15/5 | Ac | 1.15 | 0.9 |

Finally, under the conditions of this test, the anionic colorants described in Example 2 gave no measurable extract which indicates that chromophoric groups of this nature may be very advantageous.

EXAMPLE 11

The test defined in Example 10 was repeated using Dow Chemical Dowlex® 2517 linear low density polyethylene as the thermoplastic resin. The colorants tested were those contained in Table 14 below which shows a comparison between conventional polymer-soluble dyes and the colorants used in this invention. The extractions were limited to 4 hours.

TABLE 14

| Colorant | EO/PO Content | Weight Per 1000 g Resin | Color | % Extracted |
|---|---|---|---|---|
| Ex. 1 | | | | |
| #18 | — | 0.36 | Orange | 36.0 |
| #19 | — | 0.35 | " | 49.4 |
| #13 | 2/10/6 | 1.00 | " | 3.0 |
| Solvent Red 135 | — | 1.00 | Red | 20.2 |
| Ex. 8 #3 | 20EO | 0.79 | Violet | 1.9 |
| Solvent Blue 130 | — | 0.40 | Blue | 41.0 |

After setting for two weeks at ambient temperatures, the plaques containing the non-polyalkyleneoxy-substituted colorants developed a visible layer of colorant on their surface which was easily rubbed off. The plaques containing the polyalkyleneoxy-substituted colorants showed no visible change in appearance.

EXAMPLE 12

The test defined in Example 10 was repeated using USI Chemical Petrothene N208 low density polyethylene as the thermoplastic resin. The colorants tested were those contained in Table 15 below. The extractions were carried out for 8 hours. Again, a comparison to conventional polymersoluble dyes is included.

TABLE 15

| Colorant | EO/PO Content | Weight Per 1000 g Resin | Color | % Extracted |
|---|---|---|---|---|
| Ex. 1 | | | | |
| #18 | — | 0.36 | Orange | 52.9 |
| #19 | — | 0.35 | " | 80.3 |
| #13 | 2/10/6 | 1.00 | " | 2.5 |
| Solvent Red 135 | — | 1.00 | Red | 46.2 |
| Ex. 9 #4 | 20EO | 1.02 | Yellow | 3.7 |
| Solvent Yellow 141 | — | 0.7 | " | 51.1 |

As in Example 11, there was visible evidence of dye migration on those plaques containing the conventional polymer-soluble dyes which was not present on those plaques colored with the polyalkyleneoxy containing colorants.

EXAMPLE 13

The test defined in Example 10 was repeated using Amoco high density polyethylene as the thermoplastic resin. The colorants tested were those contained in Table 16 below. The extractions were carried out for 8 hours. Again, several conventional polymer-soluble dyes are included for comparison.

TABLE 16

| Colorant | EO/PO Content | Weight Per 1000 g Resin | Color | % Extracted |
|---|---|---|---|---|
| Ex. 1 | | | | |
| #18 | — | 0.36 | Orange | 29.4 |
| #19 | — | 0.35 | " | 23.5 |
| #13 | 2/10/6 | 1.00 | " | 0.3 |
| Solvent Red 135 | — | 1.00 | Red | 16.7 |
| Ex. 7 #4 | 20EO | 0.67 | " | 0.4 |

EXAMPLE 14

The test defined in Example 10 was repeated using Hercules Profax ® SA-841 polypropylene copolymer as the thermoplastic resin. The number of colorants tested were those contained in Table 17 below. The extractions were carried out for 8 hours. Several conventional polymer-soluble dyes are included for comparison.

TABLE 17

| Colorant | EO/PO Content | Weight Per 1000 g Resin | Color | % Extracted |
|---|---|---|---|---|
| Ex. 1 | | | | |
| #18 | — | 0.36 | Orange | 50.3 |
| #19 | — | 0.35 | " | 50.4 |
| #13 | 2/10/6 | 1.00 | " | 7.0 |
| Solvent Red 135 | — | 1.00 | Red | 9.4 |
| Ex. 6 #1 | — | 1.00 | Blue | 3.6 |

EXAMPLE 15

The test defined in Example 10 was repeated using B. F. Goodrich Geon ® 83457 flexible polyvinylchloride as the thermoplastic resin. The colorants teated were those contained in Table 18 below. The extractions were carried out for 4 hours with hexane in place of acetone. The hexane was then removed from the extract and the extract was then dissolved in 100 milliliters of methanol. This methanol solution was then read on the spectrometer. Several conventional non-polyalkyleneoxy-containing dyes are included for comparison.

TABLE 18

| Colorant | EO/PO Content | Weight Per 1000 g Resin | Color | % Extracted |
|---|---|---|---|---|
| Ex. 1 #13 | 2/10/6 | 1.00 | Orange | 2.9 |
| Ex. 2 #5 | 10EO | 0.72 | " | 0.6 |
| Ex. 7 #4 | 20EO | 0.67 | Red | 0.8 |
| Solvent Red 135 | — | 1.00 | " | 47.6 |
| Ex. 8 #3 | 20EO | 0.79 | Violet | 1.8 |
| Ex. 6 #1 | 4EO | 1.00 | Blue | 3.1 |
| Solvent Blue 130 | — | 0.40 | Blue | 32.5 |
| Ex. 9 #4 | 20EO | 1.02 | Yellow | 2.7 |
| Solvent Yellow 141 | — | 0.70 | Yellow | 19.7 |
| Ex. 4 | 10EO | 0.92 | " | 0.9 |

As in Examples 11 and 12 the plaques colored with the conventional dyes showed visible evidence of migration of the colorant to the surface whereas none was evident on the plaques colored with the polyalkyleneoxy containing colorants.

EXAMPLE 16

The test defined in Example 10 was repeated using Eastmen Tenite ® Butyrate 264-37200-MH cellulose acetate butyrate as the thermoplastic resin. The number of colorants tested was limited to those contained in Table 19 below. The extractions were carried out for 8 hours with hexane in place of acetone. The hexane was removed from the extract, and the extract was then dissolved in 100 milliliters of methanol. This methanol solution was then read on the spectrometer.

TABLE 19

| Colorant | EO/PO Content | Weight Per 1000 g Resin | Color | % Extracted |
|---|---|---|---|---|
| Ex. 1 #13 | 2/10/6 | 1.00 | Orange | 0.1 |
| Ex. 7 #4 | 20EO | 0.67 | Red | 0.0 |
| Solvent Red 135 | — | 1.00 | " | 5.0 |
| Ex. 8 #3 | 20EO | 0.79 | Violet | 0.4 |
| Ex. 6 #1 | 4EO | 1.00 | Blue | 0.0 |
| Solvent Blue 130 | — | 0.40 | " | 6.5 |
| Ex. 9 #4 | 20EO | 1.02 | Yellow | 0.4 |
| Solvent Yellow 141 | — | 0.70 | " | 4.4 |

EXAMPLE 17

A mixture of 9960 grams of Hercules Profax ® 6501 polyprop homopolymer, 10 grams of Irganox ® 1010 from Ciba Geigy, 10 g of calcium stearate and 20 grams of Millad ® 3940 clarifying agent from Milliken Chemical was blended and then extruded at 400° F. To 1000 grams of the pelletized resin was added 1.0 gram of the colorant prepared in Example 1 #17. The resulting mixture was then drum tumbled for 20 minutes until an even distribution of the colorant on the pellet surface was achieved. The mixture was then injection molded at 428° F. into 2 in. by 3 in. plaques having a by-level thickness of 50 and 85 mils. The plaques obtained were uniformly colored and had excellent clarity. A haze value of 19% was obtained.

EXAMPLES 18-24

The polyalkyleneoxy-substituted colorants described in the previous examples were incorporated into a wide variety of thermoplastic resins to demonstrate the broad utility of the invention. The following procedure was used. To 1000 grams of the thermoplastic resin (pellets or crystals) was added 1.0 gram of a polyalkyleneoxy-substituted colorant described in the previous examples. This mixture was then drum tumbled for 20 minutes to achieve uniform distribution of the colorant on the surface of the resin. The mixture was then injection molded into 3 in. by 2 in. plaques at a temperature reported in Table 20 below for processing the particular resin. In this manner there was obtained brightly colored plaques which had excellent color uniformity. The colorants had little or no detrimental effect on the clarity of these resins; and in instances where the uncolored resin is normally clear, the colored resins exhibited excellent clarity. The resins and colorants used are listed in Table 20.

TABLE 20

| Ex. No. | Resin | Molding Temperature | Colorant |
|---|---|---|---|
| 18 | Monsanto Lustrex ® Polystyrene | 400° F. | Ex. 1, #17 |
| 19 | Rohm & Haas Plexiglas ® Acrylic | 430° F. | Ex. 8, #4 |
| 20 | Celanese Celanex ® J245 Polybutylene Terephthalate | 500° F. | Ex. 6, #1 |
| 21 | Allied Capron ® 8202 Nylon | 500° F. | Ex. 7, #4 |
| 22 | Mobay Merlon ® M40HRF-1112 Polycarbonate | 560° F. | Ex. 1, #17 |
| 23 | Monsanto Lustran ® 248-1002 Acrylonitrile/Butadiene/Styrene | 430° F. | Ex. 9, #4 |
| 24 | Eastman Kodar ® PETG Copolyester Glycol Modified Polyethylene Terephthalate | 460° F. | Ex. 1, #17 |

What is claimed is:

1. A process for coloring a thermoplastic resin which comprises incorporating into said resin while said resin is in a molten state a colorant in the form of a polyalkyleneoxy-substituted chromophore group in a minor amount sufficient to provide coloration to said thermoplastic resin.

2. The process of claim 1 wherein said chromophore group is selected from nitroso, nitro, azo, diarylmethane, triarylmethane, xanthene, acridene, quinoline, methine, thiazole, indamine, indophenol, lactone aminoketone, hydroxyketone, stilbene, azine, oxazine, thiazine, anthraquinone, phthalocyanine or indigoid charomophore groups.

3. The process of claim 2 wherein the alkyleneoxy substituent of said colorant is selected from polyalkylene oxides and copolymers of polyalkylene oxides in which the alkylene moiety of the polymeric substituent contains 2 to about 4 carbon atoms and such polymeric substituent has a molecular weight of from about 132 to about 10,000.

4. The process of claim 1 wherein said resin is selected from polyolefin polymers and copolymers, polystyrenes, polycarbonates, ABS, polyvinyl chloride, polyvinylidene chloride, cellulosic resins, acrylic resins, polyamides and polyesters.

5. The process of claim 4 wherein said resin is a polyolefin.

6. The process of claim 5 wherein said polyolefin is selected from polyethylene, linear low density polyethylene, polypropylene, polybutylene, and copolymers made from ethylene, propylene and/or butylene.

7. The process of claim 4 wherein said resin is selected from polyvinylchloride and polyvinylidene chloride.

8. The process of claim 4 wherein said chromophore group is selected from azo, anthraquinone, triarylmethane and methine groups.

* * * * *

UNITED STATES PATENT AND TRADEMARK OFFICE
CERTIFICATE OF CORRECTION

PATENT NO. : 4,640,690

DATED : February 3, 1987

INVENTOR(S) : Baumgartner et al.

It is certified that error appears in the above-identified patent and that said Letters Patent is hereby corrected as shown below:

Column 16, line 1, the word "teated" should be --tested--.

Column 16, line 56, the word "polyprop" should be --polypropylene--.

Signed and Sealed this

Twenty-second Day of December, 1987

Attest:

DONALD J. QUIGG

*Attesting Officer*  *Commissioner of Patents and Trademarks*